Patented Apr. 11, 1933

1,903,684

UNITED STATES PATENT OFFICE

FRANCESCO CARLO PALAZZO AND FORTUNATO PALAZZO, OF FLORENCE, ITALY

PROCESS FOR THE SIMULTANEOUS PRODUCTION OF PRECIPITATED DICALCIUM PHOSPHATE AND NITRATES

No Drawing. Application filed March 21, 1929, Serial No. 348,985, and in Italy August 1, 1928.

In the usual processes for producing precipitated dicalcium phosphate from bone-dust or phosphorites hydrochloric or sulphuric acid is used in order to render soluble the phosphoric anhydride, and milk of lime is used in order to precipitate the phosphoric anhydride as dicalcium phosphate. This process however has two drawbacks, from the point of view of economy; firstly it requires a substantial consumption of lime though giving a product containing less lime than tricalcium phosphate, and secondly it requires a still greater consumption of acid because not only is the hydrochloric or sulphuric acid not recovered, but it has also to be used in greater quantities than those corresponding to the tricalcium phosphate, because calcium carbonate is always contained in the phosphate rock in less or greater proportions.

These drawbacks are obviated by the process according to invention because, instead of hydrochloric or sulphuric acid, nitric acid is used for attacking the raw materials, and furthermore the precipitation of phosphoric anhydride previously set free by nitric acid is effected by neutralization of the acid liquid with a base which may be, at will, ammonia, or soda or potash. In this way besides avoiding the waste of lime, as in the usual processes, nitrates are obtained at the same time in particularly advantageous manner, because the formation of said nitrates is partially assisted by the lime present in excess in the conversion of tricalcium phosphate into dicalcium phosphate.

The reactions on which the new process is theoretically founded are the following:

(I) $Ca_3(PO_4)_2 + 6HNO_3 = 3Ca(NO_3)_2 + H_3PO_4$ (II) $3Ca(NO_3)_2 + 2H_3PO_4 + 4MeOH = 2(CaHPO_4.2H_2O) + Ca(NO_3)_2 + 4MeNO_3$ with the following result:

The nitric acid which has been used for putting into solution the phosphoric anhydride remains in solution after the precipitation of the dicalcium phosphate, in part in the form of calcium nitrate and in part in the form of alkali nitrate (ammonium, sodium, or potassium nitrates).

Also the alkali base used for the precipitation of the dicalcium phosphate remains in solution and is quantitatively converted to alkali nitrate. No consumption of reagents (acids or bases) may be attributed to the conversion of the tricalcium phosphate of the original substance into precipitated dicalcium phosphate,—on the contrary, from each gram-molecule of converted tricalcium phosphate one gram-molecule of calcium oxid is set free:

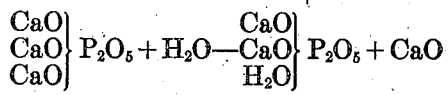

which under the form of nitrate remains in solution so that when considering the process under the other point of view namely production of calcium nitrate from acid and base, in the conversion of tricalcium phosphate to dicalcium phosphate the base for the production of calcium nitrate is furnished free of cost. Another gratuitous base for the production of calcium nitrate is furnished by the calcium-carbonate which always accompanies tricalcium phosphate.

The combination of the said two processes according to invention reduces to a minimum the cost of production of dicalcium phosphate because they are not charged with the cost of mineral (sulphuric or hydrochloric) acid and lime, as is the case in the usual processes in which these substances are all losses. As the nitric acid and the bases used in the new process are recovered by evaporation in the form of nitrates their cost obviously is to be charged to the production of the nitrates. Besides this it is to be considered that for a material portion of the nitrates, (i. e. calcium nitrate) when using nitric acid, the base is furnished free of cost by the calcium carbonate present in the raw phosphates and also by the lime set free in the conversion of the tricalcium phosphate to dicalcium phosphate.

*Example*

(a) Production of precipitated calcium phosphate.

Nitric acid in a solution of about 40%–50% is used such as directly obtainable from the acid towers during production. This nitric acid solution furthermore, if the new process has already once been carried out, is obtained by using, in the towers for the production of the acid, the aqueous liquids from the washing of the insoluble product obtained in the course of the process, i. e. the washing liquids obtained from washing the slime resulting from the treatment of the raw phosphates with nitric acid, and the washing liquids derived from washing the calcium phosphate obtained by precipitation. By using these washing liquids as absorbents in the towers the small quantities of phosphoric acid, nitric acid and nitrates contained in the said solid residues are again introduced into circulation.

The dissolution of raw phosphates by nitric acid according to the nature of the phosphates is obtained in various ways, for instance, by the acid reaching in a comparatively thin jet the powdered phosphates which by the addition of a corresponding quantity of water (usually ⅘ of the volume of nitric acid) are reduced to a paste which is continually stirred. In other cases, especially under feeble action of the absorption towers for nitric acid, a less concentrated nitric acid may be used, and finally a still more diluted acid, of about 30%, may be used by proceeding inversely, i. e. introducing the powdered phosphates into the continuously stirred acid.

In any case when carefully controlling the addition of acid or phosphate the process may be so conducted that the decomposition of calcium carbonate and freeing of phosphoric anhydride occur quite smoothly, and not the faintest evolution of nitrous vapours takes place.

When the reaction is completed the greater part of the liquid after a short rest may be decanted whereupon, as will be described below, it is subjected to further treatment, whilst the solution adhering to the undissolved residue is recovered by a series of methodical washings of the slime in a battery of decanters or simply by filtering in a rotary filter.

It is necessary that the quantity of nitric acid used for attacking the raw phosphates is adapted to their composition and calcareous content. In practice it is preferable to use an excess of nitric acid in order to accelerate the dissolution of the raw phosphates.

From the nitric acid solution obtained the phosphoric acid is precipitated in the form of dicalcium phosphate by the rather slow addition of the theoretical quantity of an alkali base with continuous energetic stirring of the acid liquor. The precipitation thus obtained of dicalcium phosphate which owing to its microcrystalline nature settles down rapidly, is easily separated from the larger part of the liquor and finally after one or two washings by decanting, it is centrifuged.

Thus a dicalcium phosphate is obtained which, besides the crystallization water, contains about 20% of moisture, and, when it is to be put on the market as an artificial manure or fertilizer, is further dried under decreased pressure at about 50° C., whilst the additional drying is superfluous if the product is to be subjected to further treatments, for instance, as raw material for the production of other high class phosphatic fertilizers with entirely or partially water soluble phosphoric anhydride. The product dried in apparatus under decreased pressure still contains crystallization water, and its content of phosphoric anhydride soluble in neutral ammonium citrate solution is usually about 38%.

(b) Products of nitrates.

In the liquid from which dicalcium phosphate has been precipitated there is a nitrate mixture containing the whole of the alkaline base as nitrate and together calcium nitrate. The further treatment of this liquid which, besides variable quantities of calcium nitrate, contains alkali nitrate, depends on the alkaline base used for the precipitation of the dicalcium phosphate.

If the said base was caustic soda the liquid is readily evaporated, under decreased pressure, to complete dryness, whereby a well crystallized mixture of sodium and calcium nitrates is obtained.

If, on the other hand, the alkali nitrate consists of ammonium nitrate, which is of a very high solubility, it remains dissolved in the calcium nitrate which in turn is soluble in its own crystallization water at 43° C. and therefore as residue from evaporation an oily liquid is obtained consisting of a mixture of ammonium and calcium nitrates which by gradual cooling at rest causes first to crystallize one of the two components, whilst by sudden cooling and simultaneous stirring, the mixture soon becomes again a hard mass. Therefore, if the dicalcium phosphate has been precipitated with ammonia, the evaporation of the filtrate is effected in two phases. After a first concentration under vacuum in multiple evaporators the liquid is finally evaporated up to dryness in a steam heated vacuum dryer from which the mixture of ammonium and calcium nitrates is obtained in the form of large flakes which are easily ground to granular forms.

If for the precipitation of the dicalcium phosphate caustic potash was used the solubilities of the potassium and calcium nitrates which are highly different in the cold, permit of separating the larger part of the potassium nitrate in a perfectly pure condition. In this case the liquid is first concentrated to a small volume and then, after crystallization of the potassium nitrate, the mother lye is further evaporated up to dryness whereby a mixture of calcium and potassium nitrates is obtained.

Having now particularly described and ascertained the nature of our said invention and in what manner the same is to be performed, we declare that what we claim is:

1. Process for the production of dicalcium phosphate and nitrates comprising in combination: attacking phosphatic raw material with nitric acid in an amount in excess of that necessary to form calcium nitrate from the total CaO content of the phosphatic material, admixing alkali metal hydrates to the resulting acid solution to precipitate dicalcium phosphate and neutralize the solution and then treating the resulting solution of alkali nitrate and calcium nitrate obtained from the precipitation to produce nitrate mixtures.

2. Process for the production of dicalcium phosphate and nitrates comprising in combination: attacking phosphatic raw material with nitric acid in an amount in excess of that necessary to form calcium nitrate from the total CaO content of the phosphatic material, admixing alkali metal hydrates to the resulting acid solution to precipitate dicalcium phosphate and neutralize the solution, and then treating the resulting solution of alkali nitrate and calcium nitrate obtained from the precipitation to produce single nitrates by fractional crystallization.

3. Process according to claim 1 which consists in treating the wash liquors obtained from washing of the solid residues resulting from the leaching of the phosphatic raw materials with nitric acid and the wash liquors resulting from the washing of the dicalcium phosphate with nitric oxides to obtain a nitric acid solution of about 40% to 50% strength and treating further quantities of phosphatic raw material with this solution in continued operation of the process.

In testimony whereof we have hereunto set our hands.

FRANCESCO CARLO PALAZZO.
FORTUNATO PALAZZO.